April 27, 1965 R. J. HEPPE ET AL 3,180,927
CRYPTOSECURE TRANSMISSION SYSTEM
Filed Sept. 7, 1961
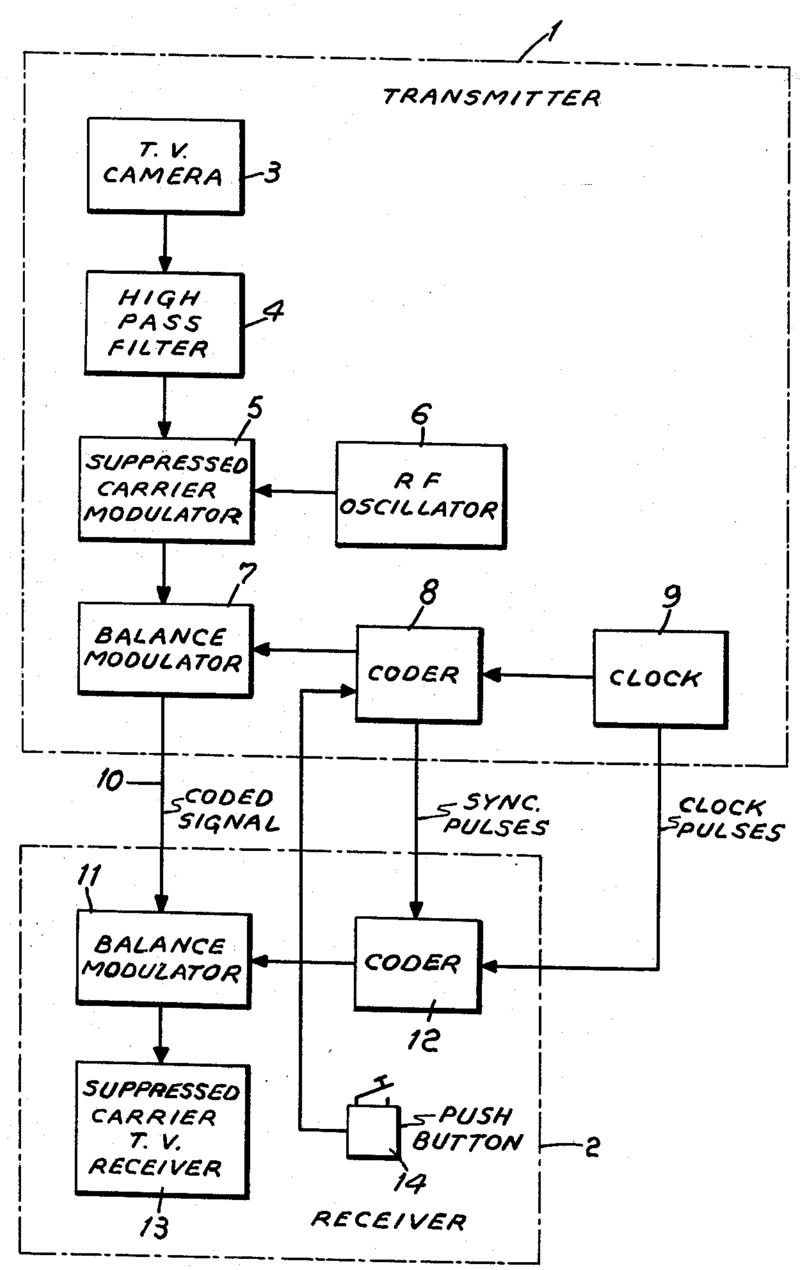
INVENTORS.
ROBERT J. HEPPE
RAYMOND L. PICKHOLTZ
BY Robert Harding Jr.
ATTORNEY United States Patent Office 3,180,927
Patented Apr. 27, 1965

3,180,927
CRYPTOSECURE TRANSMISSION SYSTEM
Robert J. Heppe, Caldwell, and Raymond L. Pickholtz, Belleville, N.J., assignors to International Telephone and Telegraph Corporation, Nutley, N.J., a corporation of Maryland
Filed Sept. 7, 1961, Ser. No. 136,528
6 Claims. (Cl. 178—5.1)

This invention relates to cryptosecure transmission of information and involves the scrambling of the information signal in a manner which will not introduce distortion or loss of information and so that it can be converted into the information signal at a receiving station equipped with the proper converting apparatus. The invention is particularly desirable for the cryptosecure transmission of television signals which would make it possible to transmit secret information over closed circuit television links, greatly facilitating the tasks of high ranking officers at military headquarters. Such a system may also be found useful in the training of personnel who must handle secret equipment and also in the transmission of facsimile and subscription television. A simplified form of the system would be suitable for the transmission of voice information with secrecy.

Accordingly, a principal object of the invention is to provide a system of transmitting information, such as television signals, which would be cryptosecure and yet would not introduce distortion or loss of information into the signal.

Another object of the invention is to provide an information transmission system utilizing both suppressed carrier modulation and pseudo-noise modulation.

Another object of the invention is to provide a system in which the transmitted information signals are subjected to phase reversals under control of the information and also under control of pseudo-noise coded sequences, whereby it would be impossible for one without the necessary equipment to determine which phase relations are caused by the pseudo-noise code and which are caused by the video signal.

Another object of the invention is to provide a receiver for the cryptosecure transmission which will separate the phase reversals caused by the information and by the pseudo-noise modulation and will convert the signal to the original information.

Still another object of the invention is to provide a cryptosecure transmission system in which a very great number of different codes for scrambling the information are available.

The above mentioned and other features and objects of the invention and the means of obtaining them will become more apparent and the invention itself will be best understood by reference to the following description of an embodiment of the invention taken in conjunction with the accompanying drawings in which the single figure is a block diagram illustrating the invention as used in a television transmission system.

In general the invention comprises apparatus for removing the direct current component from information signals, modulating these signals onto a carrier and suppressing the carrier, whereby the information signals cause phase reversals in the composite signal produced, additionally and repeatedly reversing the phase of the composite signal in accordance with a sequence of coded pulses (the pseudo-noise modulation), and apparatus at the receiving station which will receive the transmitted signals, provide phase reversals of the received signal in the opposite sense to those of the pseudo-noise modulation by means of corresponding sequences of coded pulses, and convert the signals, thus produced, in a suppressed-carrier television receiver into the original picture.

A block diagram of the system is shown in the figure. The transmitting apparatus is represented within the dotted rectangle 1, while the receiving apparatus, which may be located at a remote point, is represented within the rectangle 2.

A television camera 3 of conventional design scans the scene to be transmitted, generating a video signal. This signal is passed through a high pass filter 4 whose RC network removes the direct current component of the signal. The video signal with the direct current component removed is then applied to a suppressed-carrier modulator 5 which is also supplied with a carrier from a suitable radio frequency oscillator 6. The suppressed-carrier modulator may be a conventional modulator of this type which will modulate the video signal onto the carrier and suppress the carrier, so that the output of this modulator will be the upper and lower side bands containing the video signal and phase reversals will occur in accordance with the video information.

Phase reversals of the carrier could alternatively be produced if the video information is frequency modulated or phase modulated onto the carrier with a sufficiently high modulation index, but use of a high modulation index would be wasteful of spectrum. Therefore we prefer to use suppressed-carrier amplitude modulation.

The upper and lower side bands produced by the suppressed-carrier modulator 5 are then applied to one input of a balanced modulator 7 of well known construction, for example, the push-pull input. The other input of the balanced modulator, for example, the parallel input, is supplied with a coded sequence of pulses from a coder or pseudo-noise generator 8. The result of the two inputs to the balanced modulator will produce a coded signal output in which the phase is reversed every time the potential from the coder is shifted in value in a predetermined manner.

The coder or pseudo-noise generator 8 may be of the type described on page 559 of the article "A Communication Technique for Multipath Channels" by R. Price and P. E. Greene, Jr., published in the proceedings of the IRE for March, 1958. The code generator comprises a multiple-stage binary shift register with logical feedback, and its output is a "Mark" and "Space" binary sequence running at a specific clock rate. The sequence has many of the properties of a random sequence of 1's and 0's which would be obtained by tossing a coin every fraction of a microsecond. The pulse of the output of the balanced modulator is reversed 180° each time the code sequence goes from 0 to 1 or vice versa.

In order to produce a high degree of secrecy against attempts to guess the code, a large number of codes should be available from the coder 8. We prefer to use a 21 stage shift register in this coder or pseudo-noise generator which will make available 1,048,576 codes, including 84,672 codes producing maximum length sequences of 2,097,151 bits. This would appear to be adequate; if it is not, use of a few more stages will increase the number of codes to the billions.

The coder 8 is operated by means of a clock-pulse generator 9 which produces a steady stream of clock-pulses, each pulse causing the coder to step once, thus causing it to step through its cycle, repeatedly, and produce repeated sequences of the coded pulses.

The balanced modulator 7 will thus produce an output which will contain both phase reversals controlled by the video signal and phase reversals controlled by the coder. This composite coded or encrypted signal will be applied to a suitable unguarded transmitting medium 10 which may be a cable, radio link, or other suitable transmitting medium.

At the receiving station 2, a second conventional balanced modulator 11 is provided, one input of which is connected to the transmitting medium 10. This may, for example, the push-pull input, while the other input, the parallel input, may be supplied from a second coder 12.

The coder 12 is a duplicate of the coder 8 at the transmitter and is operated by clock-pulses from the clock-pulse generator 9 at the transmitter. These pulses may be sent over the transmitting channel 10, or over a different channel having the same time delay as the transmitting channel.

The coder 12 must be maintained in synchronism with the coder 8 at the transmitter. This may be accomplished by means of synchronizing pulses delivered to it from the coder 8 also over the transmitting channel 10 or a different channel having the same time delay. The synchronizing pulses are produced at any desired condition of the stages of the stepping register of the coder 8 which may be selected for a reference. When the register steps to this selected stage, which may be considered the start of the code word, an AND gate will produce the synchronizing pulse which will be transmitted to the coder 12 and will cause the latter to assume the same condition of its stages, this being a conventional way of synchronizing stepping registers of this nature. In using a code having a length of over 2,000,000 bits, use of this transmitted pulse is preferable to having to sweep through the entire code word.

Since synchronization of the coder at the receiver should take place within a few seconds of the time the receiver is turned on, the clock rate must be fast enough so that the code word repeats every few seconds. If a 500 kilocycle clock is used, the code word will repeat every 4 seconds, which would be the maximum synchronization time. When codes are used which produce less than maximum length sequences, the time for reaching synchronization will be shorter.

The output of the coder 12 is delivered to the balanced modulator 11 in opposite sense to that of the coder 8. Therefore the balanced modulator 11 produces phase reversals opposite to that of the balanced modulator 7 and will thus reinstate the original uncoded signal which appeared at the output of the suppressed-carrier modulator 5. This signal is then applied to a suppressed-carrier modulated television receiver 13, which may be of conventional design, adapted to receive the two side bands of a signal without the carrier and to convert this signal into the original television picture.

It should be noted that balanced modulators will produce some amplitude modulation of the signal at the times they are reversing the phase of the signal, but if the waveform produced by the coder has a very short rise time, and if the balanced modulator can reverse the phase of the carrier in this very short time, the frequency components of the resultant amplitude modulation will be outside the video band and will therefore not interfere with picture quality. Presently available coders are capable of producing the necessarily short rise times. The transmission medium must also have sufficient bandwidth to pass the rapid phase reversal of the carrier without introducing an amplitude modulation within the video band of the receiver.

The same principle can be used to encrypt voice signals, a microphone being used instead of a television camera and a radio receiver being used instead of a television receiver. In operating at voice frequencies, however, it may be desirable to run the clock at an audio frequency, so that the resultant bandwidth of the coder signal is within the audio band, thereby conserving spectrum. If this is done, however, and a 21 stage coder is used, the resultant 2,097,151 bit word would last hundreds of seconds, yielding a very long time to reach synchronization. If a 5 kilocycle clock frequency is used, and a maximum synchronization time of 26 seconds is permissible, a 17 stage coder could be used. Such a coder produces a sequence of 1's and 0's which is 131,071 bits long, there being 7,710 such maximum length sequences.

There are also 57,825 codes producing sequences of lesser length.

The above numbers of codes are adequate for many purposes, since they make the attempt of an enemy to break the code by guessing at the code extremely difficult. If greater security is required, as may be necessary in some applications, a higher clock frequency, and a coder having more than 17 stages, may be used.

The system of the invention possesses the additional advantage that the resultant signal has a considerable degree of immunity to jamming which may be of importance if the signal is to be radiated.

If higher numbers of codes are wanted for either television or voice encryption, without an increase in clock frequency, a longer code, combined with a slightly different synchronization scheme, may be used.

Suppose, for example, that a 38 stage coder is used. Such a coder has over 7 billion codes which produces sequences of about 316 billion bits. Even at a 2.5 megacycle clock rate, such a sequence would take 35 hours before it repeats. Obviously it would be impractical to wait for a synchronizing pulse at the end of a code word, or to attempt to search through the code. In such a case we provide a pushbutton 14 at each receiver, which, when pressed, will cause the transmitter coder to return to its initial reference condition, send a synchronizing pulse, and start the code over. All other receivers in the system, when receiving the synchronizing pulse, will return to their initial condition and start the code over. Thus any receiver can get into synchronization with the system virtually instantaneously.

While we have described the principles of our invention in connection with specific apparatus, it is to be clearly understood that this description is made only by way of example and not as a limitation to the scope of the invention, as set forth in the objects thereof and in the accompanying claims.

What we desire to claim and secure by Letters Patent is:

1. A cryptosecure information transmission system comprising means for producing information signals, means for modulating said signals onto a carrier and suppressing said carrier so as to produce phase reversals in the composite suppressed-carrier signal corresponding to the modulating signal, first coded means including a coder for reversing the phase of the composite suppressed-carrier signal, thus produced, at a predetermined coded sequence of times, whereby a coded signal is produced containing repeated phase reversals caused by the information to be transmitted and by said first coded means, means for transmitting said coded signal, means for receiving said transmitted coded signal, second coded means for repeatedly reversing the phase of said received signal at said same predetermined coded sequence of times, suppressed-carrier receiving means for converting the signal so treated into the original information, and a switch at the receiver for resetting the coder at the transmitter to its initial condition when said switch is closed whereby the coder may be started afresh to produce the coded sequence.

2. A cryptosecure information transmission system according to claim 1, further including means for coupling said switch at the receiver to the transmitter independently of said transmitting means.

3. A cryptosecure information transmission system comprising means for producing information signals, means for modulating said signals onto a carrier so as to produce phase reversals in the composite signal corresponding to the modulating signal, first coded means including a coder for reversing the phase of the composite signal, thus produced, at a predetermined coded sequence of times, whereby a coded signal is produced containing repeated phase reversals caused by the information to be transmitted and by said first coded means, means for transmitting said coded signal, means for receiving said transmitted coded signal, second coded means for repeatedly reversing the phase of said received signal at said same predetermined coded sequence of times, receiving means for converting the signal so treated into the original information, and means at the receiver for resetting the coder at the transmitter to its initial condition when said last-mentioned means are actuated, whereby the coder may be started afresh to produce the coded sequence.

4. A cryptosecure information transmission system comprising means for producing information signals, means for modulating said signals onto a carrier and suppressing said carrier so as to produce phase reversals in the composite suppressed-carrier signal corresponding to the modulating signal, first coded means, including a first coder and a clock for providing timing pulses to said coder, for reversing the phase of the composite suppressed-carrier signal, thus produced, at a predetermined coded sequence of times, whereby a coded signal is produced containing repeated phase reversals caused by the information to be transmitted and by said first coded means, a first transmitting means for transmitting said coded signal, a second transmitting means, independent of said first transmitting means for transmitting clock pulses from said clock, a third transmitting means independent of both said first and second transmitting means for transmitting synchronizing signals, means for receiving said transmitted coded signal, said clock pulses and synchronizing signals, second coded means including a second coder responsive to said synchronizing signals for bringing said coder into synchronism with said first coder and further responsive to said clock pulses for operating said second coder at the same rate as said first coder for repeatedly reversing the phase of said received signal at said same predetermined coded sequence of times, and suppressed-carrier receiving means for converting the signal so treated into the original information.

5. An information transmission system comprising means for producing information signals, means for modulating said signals onto a carrier to produce a composite signal, first coded means including a coder for modulating the composite signal, thus produced, at a predetermined coded sequence of times, means for transmitting said coded signal, means for receiving said transmitted coded signal, a decoder for decoding said coded signal to reproduce said composite signal, means for converting the composite signal into the original information signals, and means at the receiver for resetting at will the coder at the transmitter to its initial condition whereby the coder may be started afresh to produce the coded sequence.

6. A cryptosecure information transmission system comprising means for producing information signals, means for modulating said signals onto a carrier, first coded means including a first coder and a clock for providing timing pulses to said coder for modulating the composite signal, thus produced, at a predetermined coded sequence of times, a first transmitting means for transmitting said coded composite signal, a second transmitting means, independent of said first transmitting means for transmitting clock pulses from said clock, a third transmitting means independent of both said first and second transmitting means for transmitting synchronizing signals, means for receiving said transmitted coded signals, said clock pulses, and synchronizing signals, a decoder for decoding said received coded signal at said same predetermined coded sequence of times, said decoder being responsive to said synchronizing signals bringing said decoder into synchronism with said coder and further responsive to said clock pulses for operating said decoder at the same rate as said coder, and means for converting the decoded signals to obtain the original information signals.

References Cited by the Examiner

UNITED STATES PATENTS

| | | | |
|---|---|---|---|
| 2,402,058 | 6/46 | Loughren | 178—5.1 |
| 2,479,338 | 8/49 | Gabrilovitch | 179—1.5 |
| 2,953,643 | 9/60 | Koenig | 179—1.5 |
| 2,972,009 | 2/61 | Roschke | 178—5.1 |

DAVID G. REDINBAUGH, *Primary Examiner.*

ROY LAKE, *Examiner.*